United States Patent [19]

Gateau et al.

[11] Patent Number: 5,087,270
[45] Date of Patent: Feb. 11, 1992

[54] DEVICE USING A FLAME FOR PRODUCING SYNTHETIC GAS

[75] Inventors: Paul Gateau, Saint Nom la Breteche; Michel Maute, Les Clays sous Bois; Alain Feugier, Morainvilliers; Edmond Perthuis, Hardouin, all of France

[73] Assignee: Institut Francais du Petrol, Rueil-Malmaison, France

[21] Appl. No.: 549,624

[22] Filed: Jul. 9, 1990

Related U.S. Application Data

[63] Continuation of Ser. No. 135,068, Dec. 18, 1987, abandoned.

[30] Foreign Application Priority Data

Dec. 18, 1986 [FR] France .................. 86 17926

[51] Int. Cl.$^5$ ................................. B01J 7/00
[52] U.S. Cl. ......................... 48/127.9; 48/198.1; 48/198.2
[58] Field of Search .............. 48/107, 196 R, 196 A, 48/198.1, 198.2, 127.9; 422/239, 240

[56] References Cited

U.S. PATENT DOCUMENTS

| | | | |
|---|---|---|---|
| 2,621,117 | 12/1952 | Garrison | 48/196 R |
| 2,672,488 | 3/1954 | Jones | 48/196 R |
| 2,692,819 | 10/1954 | Hasche et al. | 48/196 R |
| 2,706,210 | 4/1955 | Harris | 48/196 R |
| 2,735,482 | 2/1956 | Tuttle | 48/196 R |
| 2,769,772 | 11/1956 | Gomery | 48/196 R |
| 2,772,199 | 11/1956 | Garbo | 48/196 R |
| 4,401,440 | 8/1983 | Alink | 422/239 |
| 4,568,524 | 2/1986 | Perline | 422/239 |
| 4,618,451 | 10/1986 | Gent | 252/373 |

Primary Examiner—Peter Kratz
Attorney, Agent, or Firm—Antonelli, Terry, Stout & Kraus

[57] ABSTRACT

A method and device are provided for producing synthetic gas by combustion of a fuel in a combustive agent deficient atmosphere, said combustive agent being gaseous, said device including first means for feeding the fuel and a part of the combustive gas into the reactor, and second means for feeding a second part of the combustive gas into the reactor, said second means including a porous wall defining at least a part of said reactor.

11 Claims, 2 Drawing Sheets

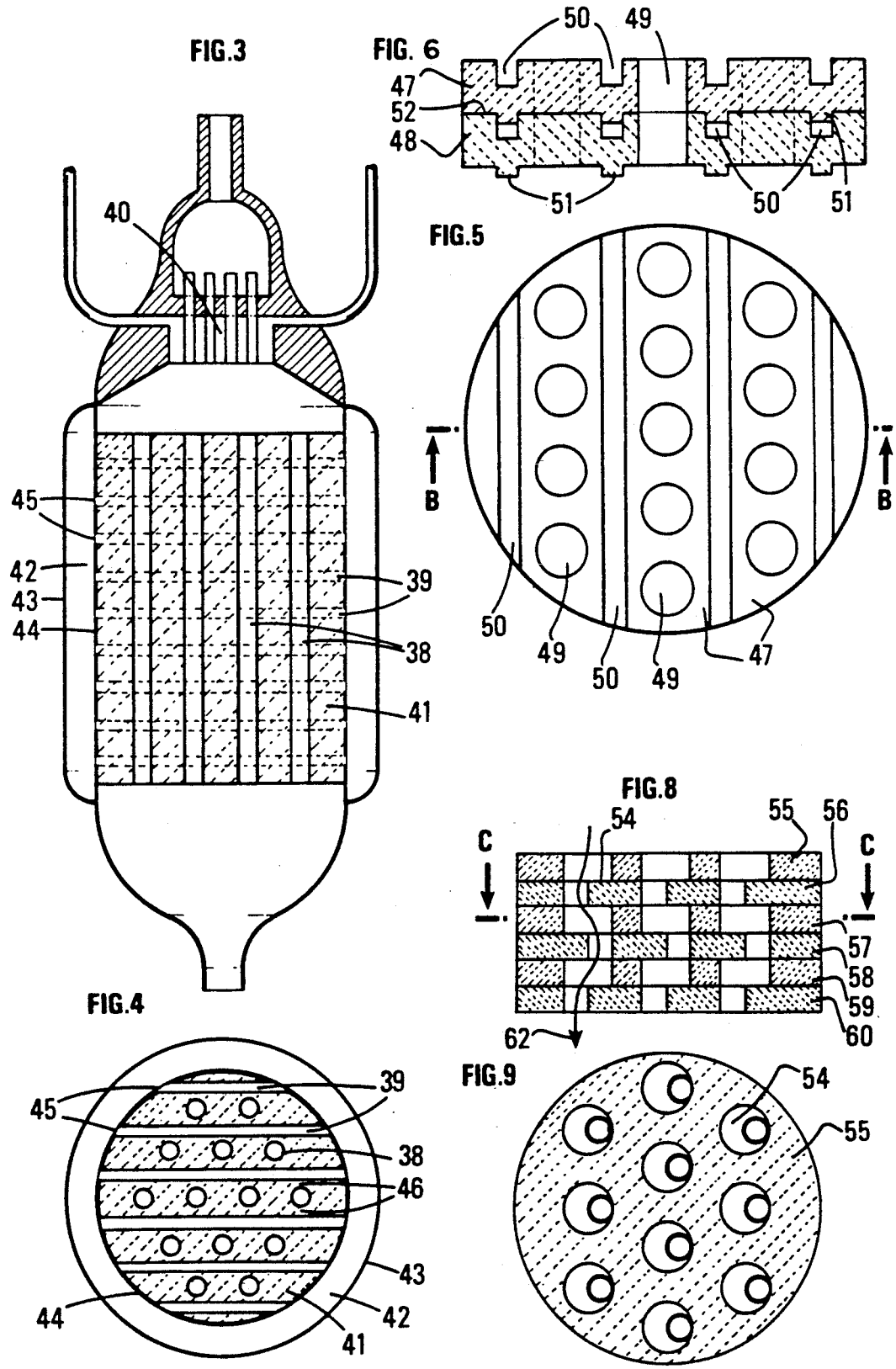

DEVICE USING A FLAME FOR PRODUCING SYNTHETIC GAS

This application is a continuation of application Ser. No. 135,068, filed Dec. 18, 1987 now abandoned.

BACKGROUND OF THE INVENTION

The present invention relates to a method and device using a flame for producing synthetic gas.

The combustion of hydrocarbons, such as natural gas, in an atmosphere deficient in oxygen, leads to the formation of carbon monoxide (CO), hydrogen ($H_2$) but also carbon dioxide ($CO_2$) and water ($H_2O$).

For example, if a mole of methane ($CH_4$) is combusted with 0.7 mole of oxygen, 54.9% mole of hydrogen ($H_2$) is obtained; 31.6% mole of carbon monoxide (CO); 1.7% mole of carbon dioxide ($CO_2$) and 11.7% mole of water ($H_2O$) in adiabatic equilibrium.

However, by the very combustion process, intermediate hydrocarbons are present, with formation of less CO and $H_2$, but more $CO_2$ and $H_2O$. Tests have been carried out for minimizing this phenomenon. The conversion into CO and $H_2$ is all the better if the walls of the reactor are adiabatic (the shape of the reactor must not allow radiation losses).

There is no major problem for O/C ratios close to 1.5 mole/mole, but for lower ratios it is necessary to preheat the gases. In the presence of hydrocarbons heavier than methane, the formation of soot may limit the lowering of the O/C ratio.

SUMMARY OF THE INVENTION

The present invention provides a method and device for avoiding the presence of soot at the outlet of the reactor particularly under delicate operating conditions, for example for low O/C ratios and when operating in the presence of hydrocarbons other than methane, or else when the reactor is fed with air instead of oxygen.

The device of the invention makes it possible to obtain or produce synthetic gas by combustion of fuel in an atmosphere deficient in combustive agent or oxidizer (such as oxygen or air enriched or not with oxygen), the combustive agent being gaseous.

The device includes first means for feeding the fuel and a part of the combustive agent into a reactor, second means for feeding a second part of the combustive agent into the reactor, these second means including at least one porous wall.

This porous wall may define at least a part of the reactor.

The porous wall may define substantially the reaction zone of the reactor.

The porous wall may have substantially the shape of a cylinder. This cylinder may have at one of its ends the first means for feeding the fuel and a part of the combustive agent and be closed at its other end.

The cylinder may include a duct for discharge of the effluents.

When the gases from the first feed means undergo in said reactor at least a change of direction because of the presence of a deflecting wall, at least a portion of this deflecting wall may be porous and serve for introducing a part of the combustive agent.

The device of the invention may comprise a reactor formed from at least two parts, the first part having at one end at least one outlet orifice situated substantially opposite the first feed means, the second part of the reactor surrounding said end while leaving free a passage space for the gases. In this case, the deflecting wall may correspond to the portion of the wall of the second part of the reactor situated opposite the outlet orifice of the first part of the reactor.

The second part of the reactor may surround or envelope substantially the whole of the first part of the reactor.

The porous wall may have one face, which does not define the reactor, surrounded by a sealed enclosure, this enclosure itself including combustive agent feed means.

The porous wall may be made from a material having good heat insulation characteristics and/or may include a material having catalytic properties, such as zirconium oxide or zirconia.

The first feed means may include several tubes and may convey said fuel and a part of the combustive agent separately into the reactor.

The different above mentioned reaction zones may be formed in a single or multipiece porous element, that is to say comprising several subelements which may be stacked.

These stacked subelements may have passages and/or grooves and/or tongues.

The present invention also relates to a method for producing or obtaining synthetic gas by combustion with deficiency in combustive agent of a fuel, said combustive agent being gaseous.

In accordance with this process, the fuel and a part of the combustive agent is fed into the reactor by first feed means and another part of the combustive gas is fed through a porous wall participating in defining said reactor.

In a variant of the method, a reaction catalyst may be fed through the porous wall.

In another variant of the method, the combustive agent fed by the first feed means may be different in nature and/or composition from that fed by said second feed means. However, preferably, they may be identical.

In one embodiment, the reactor has a double porous skin (made from a refractory or ceramic material), through which a part of the combustive agent is introduced, such as O2 or air, enriched or not with oxygen, or any other gas used during the process (steam).

In a particular embodiment of the present invention, the hydrocarbon and the oxygen are introduced separately by the burner and a mixture of oxygen and steam by the porous wall.

The prior art may be illustrated by the article by M. Kitano and Y. Otsuka entitled "Suppression Effects of stretching flow on soot emission from laminar diffusion flames" published in Combustion Science and Technologie 1985, volume 42, pages 165-183 and by the U.S. Pat. 4 618 451.

The present invention is particularly well adapted for producing carbon monoxide (CO) and hydrogen ($H_2$).

BRIEF DESCRIPTION OF THE DRAWINGS

The present invention will be better understood and its advantages will be clear from the following description of particular examples, which are in no wise limitative, illustrated by the accompanying FIGS. in which:

FIG. 3 shows one embodiment in which the reactor has several reaction zones made from a porous material, and FIG. 4 to 10 show different variants of these reaction zones.

MORE DETAILED DESCRIPTION OF THE INVENTION

Figure 1:
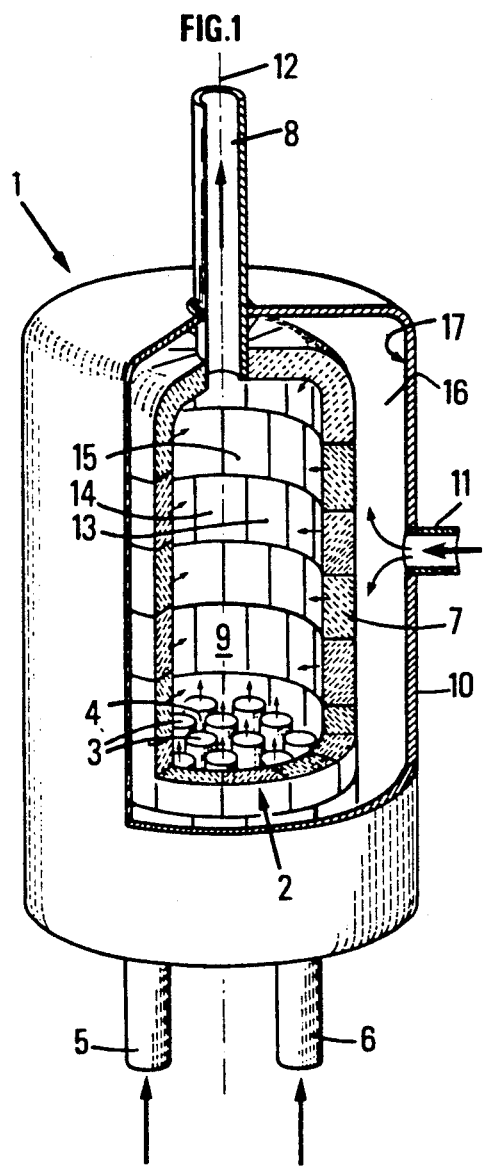
FIG. 1 shows a first embodiment of the invention including a substantially cylindrical porous wall.

In FIG. 1, reference 1 designates a reactor as a whole. This reactor includes a burner 2 which may comprise several tubes 3. Some of these tubes may serve for feeding a combustive gas containing oxygen and the others for feeding a fuel.

Any other type of burner may be used without departing from the scope and spirit of the present invention.

In the case of FIG. 1, tubes 3 serve for feeding oxygen and it is the free spaces 4 between the tubes which serve for feeding the gas to be transformed, such as methane.

The gases may be fed to burner 2 by a duct 5, in so far as the fuel gas is concerned, and by duct 6 insofar as the part of the combustive gas is concerned.

Burner 2 has mounted thereover a porous cylindrical casing 7. This casing has at its upper part an effluent discharge pipe 8.

In the example shown in FIG. 1, the porous casing 7 with the burner, placed at its lower end, defines the reaction zone 9.

The porous casing 7 is itself enclosed in a sealed enclosure 10. This enclosure has passing therethrough the effluent discharge pipe 8 as well as ducts 5 and 6 for feeding the burner with methane ($CH_4$) and oxygen ($O_2$).

Furthermore, this enclosure is fed with combustive gas, such as oxygen, through a duct 11.

In the present invention, a free space or distribution zone 16 is maintained between enclosure 10 and the porous casing 7.

The oxygen arriving through duct 11 will occupy this space 16 and will bathe the porous wall, thus supplying it with oxygen. The oxygen penetrates into the reaction zone 9 and participates in the reaction so that complete conversion of the methane into CO, $H_2$, $CO_2$, and $H_2O$ is obtained.

Of course, the amount of oxygen which is fed into the reaction zone 9 through duct 6 of burner 2 is insufficient to obtain complete conversion of the methane and the oxygen penetrating through the porous wall 7 is necessary so as to obtain complete conversion.

The porous wall 7 may have variable porosity depending on whether it supplies one point or another of the reaction zone 9, so as to vary the flow introduced at the different positions in the reaction zone 9. For example, the porosity may vary along the axis 12 of reactor 1.

This porosity variation may be obtained more particularly by the assembly of modular elements, such as plates or bricks, 13, 14, 15 of different porosities.

Substantially at the level of burner 2, the porous wall may be extended by a sealed wall or by the body of the burner 2 itself.

Steam or any other gas may also be fed into the reaction zone 9 so as to complete the process. This may be achieved, either through duct 6 of the burner, or through duct 11 feeding the free space 16.

The internal walls of the enclosure may be advantageously coated with an antiradiation protection or heat protection layer 17.

This device has several advantages. The gas which passes through the porous wall is heated and thus cools this wall. However, in the production of synthetic gas, walls which are too cold are proscribed for they reduce the conversion efficiency (jelling of the reactions) and may induce the accumulation of carbon. In our case, the oxygen which is diffused creates a reaction limit layer capable of protecting the wall, then colder, from the gases being converted.

It makes it possible to introduce a part of the oxygen at a distance from burner 2. The combustion at the the outlet of burner 2 is much richer since the oxygen is at that location insufficient for complete conversion.

Thus, the combustion at the level of burner 2 takes place at a lower temperature, which thus protects the burner.

The oxygen is gradually fed through the porous wall 7 so as to complete the conversion.

The device of the invention makes possible operation under good safety conditions. In fact, any destruction of the reactor begins by attacking the porous wall which is an intermediate wall, because of the presence of enclosure 10.

In addition, during operation, the temperature of the jet from the burner is lower than what would have been obtained if all the conversion products had been introduced by the burner.

The diffusion speed may moreover be increased in the part of the wall the most subjected to heat exchanges, by adjusting the porosity of this part of the wall.

The device of the invention avoids having to introduce oxygen preheated to very high temperatures for feeding the burner.

Figure 2:
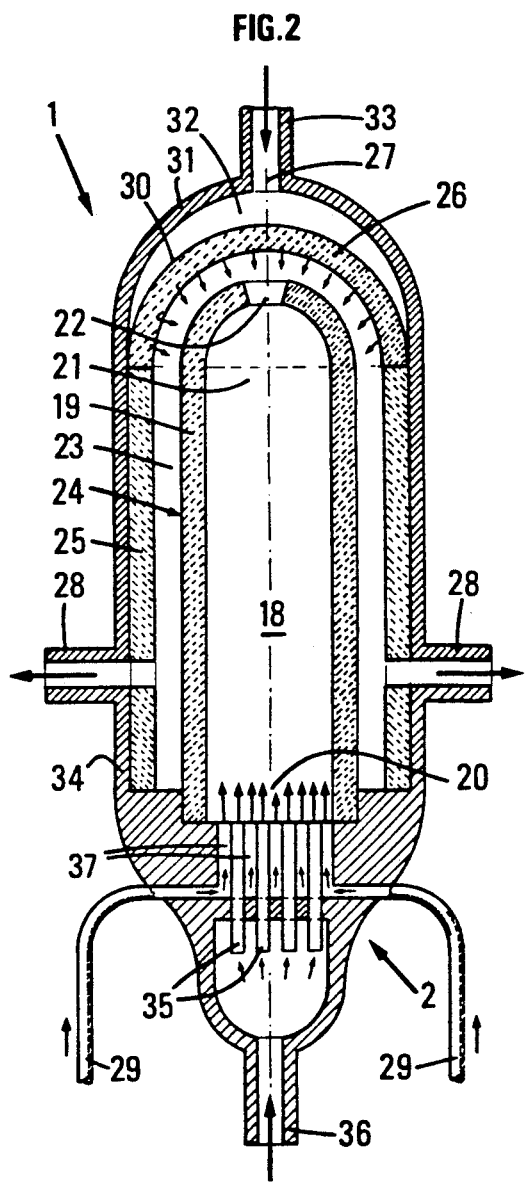
FIG. 2 illustrates another embodiment in which the reactor is formed of two parts.

FIG. 2 illustrates another embodiment in which the reactor comprises two parts.

The first part 18 is defined by the inside of an elongate element 19 which may be advantageously made from a refractory material.

Burner 2 is placed at the lower end 20 of this element 19. At another end 21 of this element there is provided an opening 22, this opening feeds the second part of reactor 23.

This second part of reactor 23 surrounds the upper end 21 of the elongate element 19.

The second part of the reactor is defined by the external wall 24 of the elongate element 19, by a cylindrical casing 25 made from a refractory material and by a dome or cover 26 seated on this cylindrical casing 25 so as to close the upper end 21 of the elongate element 19.

Dome 26 is placed opposite the outlet orifice or opening 22 for the effluents from the first part of the reactor.

This orifice is itself placed in the axis 27 of the burner which is also the axis of the reactor.

The effluents leaving through orifice 22 are deflected by dome 26 by 180° and travel through the second part of reactor 23 by passing along the external wall of the elongate element 19 to leave through ducts 28.

In this embodiment, dome 26, which is a deflecting wall, is made from a porous possibly refractory material and serves for introducing a part of the combustive gas other than that fed through ducts 29 of the burner.

The face 30 of dome 26 which does not define the reactor is surrounded by a sealed enclosure 31 which defines a chamber 32.

This chamber 32 is fed with combustive agent, such as oxygen, through a duct 33. The oxygen diffuses through the porous wall 26 of the dome and feeds the second part of reactor 23 with oxygen.

In FIG. 2, the sealed enclosure 31 forms part of an external casing 34 which surrounds the whole of the reactor and which includes ducts 33 for feeding oxygen, ducts 28 for discharging the effluents and the housing for burner 2.

Burner 2 is of the multitube or another type, and has therefore several tubes 35 for feeding the fuel such as natural gas. This latter reaches burner 2 through a duct 36.

The combustive agent, such as oxygen, is fed into the first reactor through the space 37 left free between the tubes 35 of the burner.

In this embodiment, the soot coming from the first reactor is collected on the porous dome shaped wall. It should be noted that the soot accumulates by coalescing and therefore may be readily collected from this wall.

The porous dome 26 in contact with the reactor heats the oxygen which passes therethrough, which causes perfect oxidization of the soot collected on the internal face of the dome. A catalytic action of the porous material may also be considered which may include, for example, zirconium.

Thus, the device of the present invention is more particularly advantageous when soot is produced in the reaction during the production of a synthetic gas. In fact, if the soot clings to the porous wall it is then reburnt by the combustive agent which seeps through the porous wall. However, the shape of the reactor shown in FIG. 1 is not favorable for clinging. That of FIG. 2 is more efficient, the soot striking wall 30 through orifice 22, but a part of the soot risks being entrained nevertheless.

The embodiments of the porous wall given hereafter facilitate the clinging of the soot and consequently elimination thereof by oxidization because of the combustive agent penetrating through these porous walls.

In this embodiment, the surface/volume ratio is increased.

In the embodiment shown in FIG. 3, the porous element 41 includes a multitude of primary orifices 38 for the passage of the synthetic gas and secondary orifices 39 for feeding the combustive agent which is to pass through the porous element 41. The primary and secondary orifices are in fact in the form of channels and more exactly tubes. Reference 40 designates the burner which may be of the type already described in the present application. The secondary channels 39 may be fed with additional combustive gas through a supply chamber 42 defined by a casing 43 surrounding another casing 44 in which the porous element 41 is placed. This wall 44 is formed with orifices 45 for feeding the secondary channels 39.

In FIG. 3, the combustive gas supply for chamber 42 has not been shown. FIG. 4 shows in cross section the reactor shown in FIG. 3 through line A—A. It will be noted in this Fig. that the primary and secondary channels do not intersect and that the combustive gas which feeds the secondary channels 39 reaches the primary channels 38 after "migration" in the zones referenced 46 (FIG. 4) of the porous material 41.

The soot which is deposited on the walls of the primary channels is oxidized by the combustive gas coming from the secondary channels.

The porous element 41 may be a single piece or a multipiece element, which facilitates the industrial production thereof.

FIGS. 5 and 6 show one example of the porous element formed by stacking several blocks.

FIG. 6 corresponds to a section through line BB of the porous element 41 shown in FIG. 5. The porous element is formed by stacking several porous subelements 47, 48. Each of these elements includes passages 49 which will form the primary channels after stacking these subelements.

The secondary channels are formed by rectilinear grooves 50 which cooperate possibly with tongues 51.

The junction plane 52 may be left as it is, or else coated with a layer (non porous or porous), for filling up the clearance.

Figure 7:
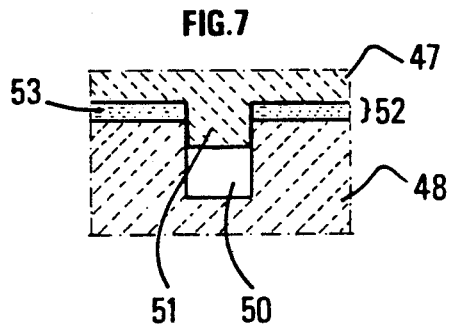

This layer may be a refractory mortar 53, as shown in the detail of FIG. 7.

If the porosity of the subelements 47, 48 is sufficient, this layer will be pointless for the amount of gas arriving through the joint plane will then be small, compared with that which will be diffused through the pores.

The shape of the primary and/or secondary channels may be varied, particularly to obtain better trapping of the soot and/or a better distribution of the additional combustive gas and/or for increasing the exchange surfaces.

Thus, the channels may be provided with deflectors or baffles 54.

Such an embodiment is shown in FIGS. 8 and 9. It comprises a stack of cellular porous subelements 55 to 60 with holes 51 or passages of different and off centered diameters.

Arrows 62 show the paths of the gas.

FIG. 9 corresponds to a section through line CC shown in FIG. 8.

For feeding the additional combustive gas, the procedure may be as for the embodiment shown in FIG. 3.

Considering the small flow of secondary combustive gas, the section of the secondary orifices will be smaller than that of the primary orifices.

Figure 10:
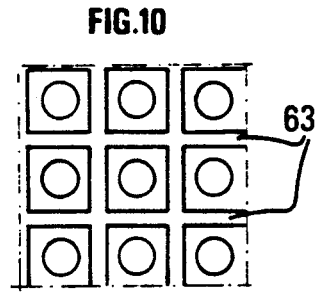

Without departing from the scope of the present invention, the secondary channels 63 may intersect, as shown in FIG. 10.

The combustive gas used may include oxygen, air and/or water in vapor form and that for the different embodiments illustrated and the fuel may be methane ($CH_4$) or any other hydrocarbon.

What is claimed is:

1. A device for producing synthetic gas by combustion of a fuel in an atmosphere having a deficiency of combustive agent, said combustive agent being gaseous, which comprises a reactor including a sealed enclosure containing several reaction zones defined at least in part by a porous wall, first means for feeding the fuel and a part of the combustive agent into the enclosure and into the several reaction zones of the reactor, second means for feeding a second part of the combustive agent into the reaction zones, said second means comprising a supply chamber for supplying said second part of the combustive agent to said porous wall and said porous wall through which the second part of the combustive agent passes to thereby form a reaction limiting layer for protection of the porous wall from the gases being converted in said reaction zones and for prevention of accumulation of soot on the porous wall within said reaction zones; an interior casing, and at least one porous element positioned within said casing, said at least one porous element defining two groups of channels for the passage of gases, said porous wall comprising a plurality of porous wall portions located between said two groups of channels, a first group of said two groups of channels defining the several reaction zones within said reactor and a second group of said two groups of channels supplying the second part of the combustive agent to the plurality of porous wall portions; said supply chamber surrounding a portion of said interior casing and being in fluid communication with said second group of channels for supplying the second part of the combustive agent to said second group of channels and into said several reaction zones via said porous wall portions.

2. The device as claimed in claim 1, wherein said porous element is made from a material having good heat insulation characteristics.

3. The device as claimed in claim 1, wherein said porous element includes zirconium oxide as a material having catalytic properties.

4. The device as claimed in claim 1, wherein said first feed means comprises a burner located at one end of the sealed enclosure and in fluid communication with said reaction zones and several tubes in fluid communication with said burner and said first feed means convey said fuel and said part of the combustive agent separately into the reactor via said burner.

5. The device as claimed in claim 1, wherein said several reaction zones are formed from a single piece porous element forming the porous wall.

6. The device as claimed in claim 1, wherein said several reaction zones located within said first group of channels and the at least one porous element comprises a plurality of porous subelements forming the porous wall portions.

7. The device as claimed in claim 6, wherein said subelements are stacked on each other.

8. The device as claimed in claim 7, wherein said subelements include at least one of grooves, passages and tongues.

9. The device as claimed in claim 1, wherein said first group of channels include a deflecting wall, at least a portion of said deflecting wall being formed by the porous wall and serving for introducing a second part of the combustive agent into said several reaction zones.

10. The device as claimed in claim 1, wherein said first means for feeding the fuel and a part of the combustive agent into the enclosure and into the reaction zones of the reactor includes a burner located at one end of the sealed enclosure and said sealed enclosure including at least one outlet means in fluid communication with the reaction zones for discharging said synthetic gas from said reactor, said outlet means being free of the presence of soot.

11. The device as claimed in claim 1, wherein said porous wall contains pores through which the second part of the combustive agent migrates into the reaction zones.

* * * * *